US010710912B1

(12) United States Patent
Gomez

(10) Patent No.: US 10,710,912 B1
(45) Date of Patent: Jul. 14, 2020

(54) SUBMERISSIBLE CHEMICAL DISPENSER FOR A POOL

(71) Applicant: Francisco Javier Gomez, Pembroke Pines, FL (US)

(72) Inventor: Francisco Javier Gomez, Pembroke Pines, FL (US)

( * ) Notice: Subject to any disclaimer, the term of this patent is extended or adjusted under 35 U.S.C. 154(b) by 0 days.

(21) Appl. No.: 16/389,947

(22) Filed: Apr. 20, 2019

(51) Int. Cl.
*C02F 1/68* (2006.01)
*C02F 103/42* (2006.01)

(52) U.S. Cl.
CPC .......... *C02F 1/688* (2013.01); *C02F 2103/42* (2013.01)

(58) Field of Classification Search
CPC .............................. C02F 1/688; C02F 2103/42
USPC .......... 210/167.11, 242.1; 422/265, 276, 277
See application file for complete search history.

(56) References Cited

U.S. PATENT DOCUMENTS

| 2,934,409 | A | | 4/1960 | Biehl | |
|---|---|---|---|---|---|
| 4,217,331 | A | * | 8/1980 | Schaub | B01D 11/00 |
| | | | | | 210/167.11 |
| 4,702,270 | A | * | 10/1987 | King, Sr. | B01F 1/0027 |
| | | | | | 137/268 |
| 4,763,685 | A | | 8/1988 | King, Sr. | |
| 4,828,803 | A | * | 5/1989 | Nicholson | B01F 1/0027 |
| | | | | | 137/268 |
| 5,059,316 | A | | 10/1991 | Renton | |
| 5,441,711 | A | | 8/1995 | Drewery | |
| 6,432,371 | B1 | | 8/2002 | Oliver, Jr. | |
| 6,641,787 | B1 | | 11/2003 | Siggins et al. | |
| 7,922,982 | B1 | | 4/2011 | Brennan | |
| 9,174,177 | B2 | | 11/2015 | King, Jr. et al. | |
| 10,029,931 | B2 | | 7/2018 | King | |
| 2004/0175311 | A1 | * | 9/2004 | Cormier | A61L 2/18 |
| | | | | | 422/265 |
| 2005/0163684 | A1 | | 7/2005 | Sherr | |
| 2008/0217258 | A1 | | 9/2008 | Buchan | |
| 2011/0089121 | A1 | * | 4/2011 | Van Der Meijden | B01F 1/0033 |
| | | | | | 210/749 |
| 2015/0322683 | A1 | | 11/2015 | Edwards | |

* cited by examiner

*Primary Examiner* — Fred Prince
(74) *Attorney, Agent, or Firm* — Mark C. Johnson; Johnson Dalal

(57) ABSTRACT

A submersible chemical dispenser for a pool having a chemical tablet housing defining an internal cylindrical cavity and an outer surface surrounding the internal cylindrical cavity, having a plurality of apertures defined thereon and spatially and fluidly coupled to the internal cylindrical cavity, and with a coupler member coupled thereto, wherein the internal cylindrical cavity is shaped and sized to receive a plurality of water-soluble chemical tablets. The dispenser also includes a buoyancy container defining a buoyancy cavity with a gas therein and having a first end operably configured to selectively, removably, and directly couple to the coupler sidewall in a locked configuration to orient the buoyancy container in an upright orientation with respect to a longitudinal axis of the chemical tablet housing and to encapsulate the buoyancy cavity.

16 Claims, 6 Drawing Sheets

SUBMERISSIBLE CHEMICAL DISPENSER FOR A POOL

FIELD OF THE INVENTION

The present invention relates generally to chemical dispensers, and, more particularly, relates to dispensing assemblies operably configured to be submersible and having one or more water-soluble chemical tablets housed therein.

BACKGROUND OF THE INVENTION

Many individuals and entities own a pool that require routine maintenance to the liquid body housed therein for the pool to be useable and/or enjoyable. More specifically, a pool that houses a liquid body of body can have viruses or bacteria that should be eliminated or reduced for the safety of those using the pool. While a filter in a pool facilitates in keeping a pool clean, to fully effectuate the same, many users add chemical agents or solutions to the pool water to kill the viruses and bacteria, or otherwise act as a sanitizer. In some instances, this chemical agent is chlorine, wherein a swimming pool ideally has at least 1 part per million (ppm) chlorine concentration and will not go above 3 ppm. To keep the swimming pool water sanitary, users are often required to routinely add the sanitizing agent to the pool water themselves or pay others to do so (which can be time- and cost-intensive).

To effectively solve the above problems, some individuals utilize motorized or floating sanitizing devices that travel around the pool, dispersing a dissolved or liquid sanitizer agent therein. These devices, however, make it inconvenient or unsafe for users desiring to utilize the pool. Additionally, many of these devices are known to cause damage to pool liners as they get caught in one location and dispense too much chlorine in a concentrated area, discoloring and even damaging the pool liner. Some users also add water-soluble tablets to the skimmer basket so when the filter is running, water will move quickly over the tablets, thereby dissolving the tablets much more quickly. The chlorinated water is then pushed into the pool through the return jets, allowing chlorine to spread evenly throughout the pool. These methods problematically result in the tablets continuing to dissolve, even when the filter is not running, thereby creating highly chlorinated and highly corrosive water that can damage the pool's equipment if left unattended. Other methods include employing the use of a chlorinator that allows a user to set a level of dispensing sanitizing agent, but these methods are often more costly, require routine maintenance to the devices, can be inaccurate as well.

One known device designed to overcome the above-described disadvantages includes U.S. Pat. No. 10,029,931 B2, issued on Jul. 24, 2018, to King. These devices include using a stacked chlorine tablets or consumable dispersant for use in pools, spas, and hot tubs. When desired for use, the user fills a container with a cartridge having a dissolvable material that enables the device to sink to a bottom of a body of liquid. When the dissolvable material dissipates, the buoyance of the device (created by the inside container or pockets within the device) causes the device to raise to the surface of the body of liquid. Problematically, however, this device does not allow it to be selectively adjusted depending on the amount of tablets to be inserted and is relatively costly to manufacture considering the multiple internal compartments and external components of the device.

Therefore, a need exists to overcome the problems with the prior art as discussed above.

SUMMARY OF THE INVENTION

The invention provides a submarine-shaped and submersible chemical dispenser for a pool that overcomes the hereinafore-mentioned disadvantages of the heretofore-known devices and methods of this general type and that effectively and efficiently allows water-soluble tablets to be inserted and housed therein for dissipation and, once dissipated, permits the device to come to the top of the pool for replacement and/or removal.

With the foregoing and other objects in view, there is provided, in accordance with the invention, a submersible chemical dispenser for a pool or other body of water that includes a chemical tablet housing defining an internal cylindrical cavity and has an outer surface surrounding the internal cylindrical cavity, has a plurality of apertures defined thereon and spatially and fluidly coupled to the internal cylindrical cavity, and has a coupler member coupled thereto with a coupler sidewall. The internal cylindrical cavity maybe shaped and sized to receive a plurality of water-soluble chemical tablets for dissolving in a body of water. The dispenser includes a buoyancy container defining a buoyancy cavity with a gas therein and having a first end operably configured to selectively, removably, and directly couple to the coupler sidewall in a locked configuration to orient the buoyancy container in an upright orientation with respect to a longitudinal axis of the chemical tablet housing and to encapsulate the buoyancy cavity.

In accordance with another feature, an embodiment of the present invention includes the chemical tablet housing having a main body with a first end and a second end, and a lid with a bottom end and a top end, wherein the bottom end of the lid is operably configured to selectively, removably, and directly couple to the first end of the main body in a locked and threaded configuration.

In accordance with a further feature of the present invention, the main body have a main body length separating the first and second ends of the main body, wherein the plurality of apertures span at least 50% of the main body length.

In accordance with yet another feature, an embodiment of the present invention includes the chemical tablet housing having an outer perimeter, wherein the plurality of apertures are disposed around at least 25% of the outer perimeter. The plurality of apertures may be disposed in a tightly spaced configuration with respect to one another.

In accordance with a further feature of the present invention, the internal cylindrical cavity includes the plurality of water-soluble chemical tablets are disposed therein in a longitudinally aligned configuration. In other embodiments, they may be axially aligned in the longitudinal direction. The plurality of water-soluble chemical tablets may also be disposed within the internal cylindrical cavity in a secure configuration.

In accordance with an additional feature, an embodiment of the present invention also includes the plurality of water-soluble chemical tablets generating a combined tablet weight and the chemical tablet housing generating a housing weight, wherein a buoyancy force generated from a submerged chemical dispenser is less than the combined tablet weight and the housing weight and greater than the housing weight.

In accordance with a further feature of the present invention, the coupler member projects from the outer surface of the chemical tablet housing and includes an outer surface and inner surface opposing the outer surface, the inner surface including threads disposed thereon and defining a coupler member recess shaped and sized to receive the first end of the buoyancy container.

In accordance with yet another feature of the present invention, the first end of the buoyancy container is operably configured to selectively, removably, and directly physically couple to the coupler sidewall, wherein the buoyancy cavity is fluidly uncoupled to the internal cylindrical cavity. The buoyancy container may also be coupled to the coupler sidewall and oriented at a substantially perpendicular orientation with respect to a longitudinal axis defined by the chemical tablet housing.

In accordance with another feature, an embodiment of the present invention also includes the chemical tablet housing also includes an upper end with the coupler member disposed thereon and a lower end, opposite the upper end of the chemical tablet housing, and having a plurality of legs disposed thereon and spanning outwardly away from the outer surface. The plurality of legs may each have a bottom surface that collectively define a lower plane to dispose the buoyancy container at a substantially perpendicular orientation with respect to the lower plane.

Also in accordance with the present invention, a submersible chemical dispenser for a pool is disclosed that includes a chemical tablet housing defining an internal cylindrical cavity with a plurality of water-soluble chemical tablets disposed therein in a secure and aligned configuration, having an outer surface surrounding the internal cylindrical cavity, having a plurality of apertures defined thereon and spatially and fluidly coupled to the internal cylindrical cavity, and with a coupler member coupled to and extending in a direction away from the outer surface of the chemical tablet housing on an upper side thereof and having a coupler sidewall, the chemical tablet housing having a plurality of legs each respectively coupled to and extending a direction away from the outer surface of the chemical tablet housing and opposite the direction the coupler member is extending away from the outer surface. The dispenser also has a buoyancy container defining a buoyancy cavity with a gas and/or liquid (but, for brevity, often referred to herein as "gas") inserted or otherwise disposed therein and having a first end operably configured to selectively, removably, and directly couple to the coupler sidewall in a locked configuration to encapsulate the buoyancy cavity.

In accordance with another feature of the present invention, the locked configuration includes the buoyancy container oriented in an upright orientation with respect to a longitudinal axis of the chemical tablet housing.

In accordance with an additional feature, an embodiment of the present invention also includes the plurality of legs each include four legs each having a bottom surface, the bottom surfaces of the four legs define a lower plane to dispose the buoyancy container at a substantially perpendicular orientation with respect to the lower plane.

Although the invention is illustrated and described herein as embodied in a submersible chemical dispenser for a pool, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. As used herein, the term "wall" is intended broadly to encompass continuous structures, as well as, separate structures that are coupled together so as to form a substantially continuous external surface. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the submarine-shaped body of the dispenser.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
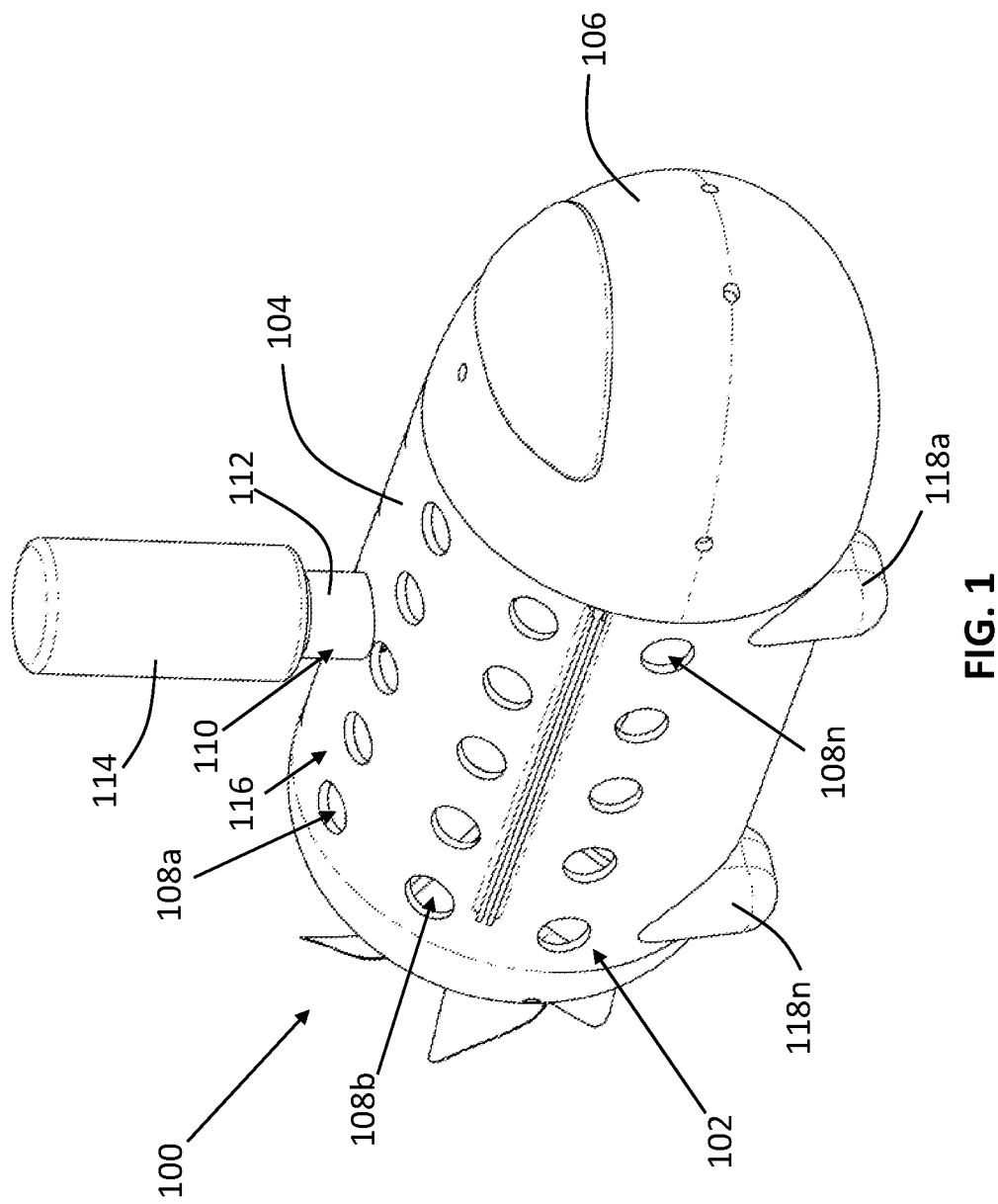
FIG. 1 is a perspective view of a submarine-shaped and submersible chemical dispenser for a pool in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
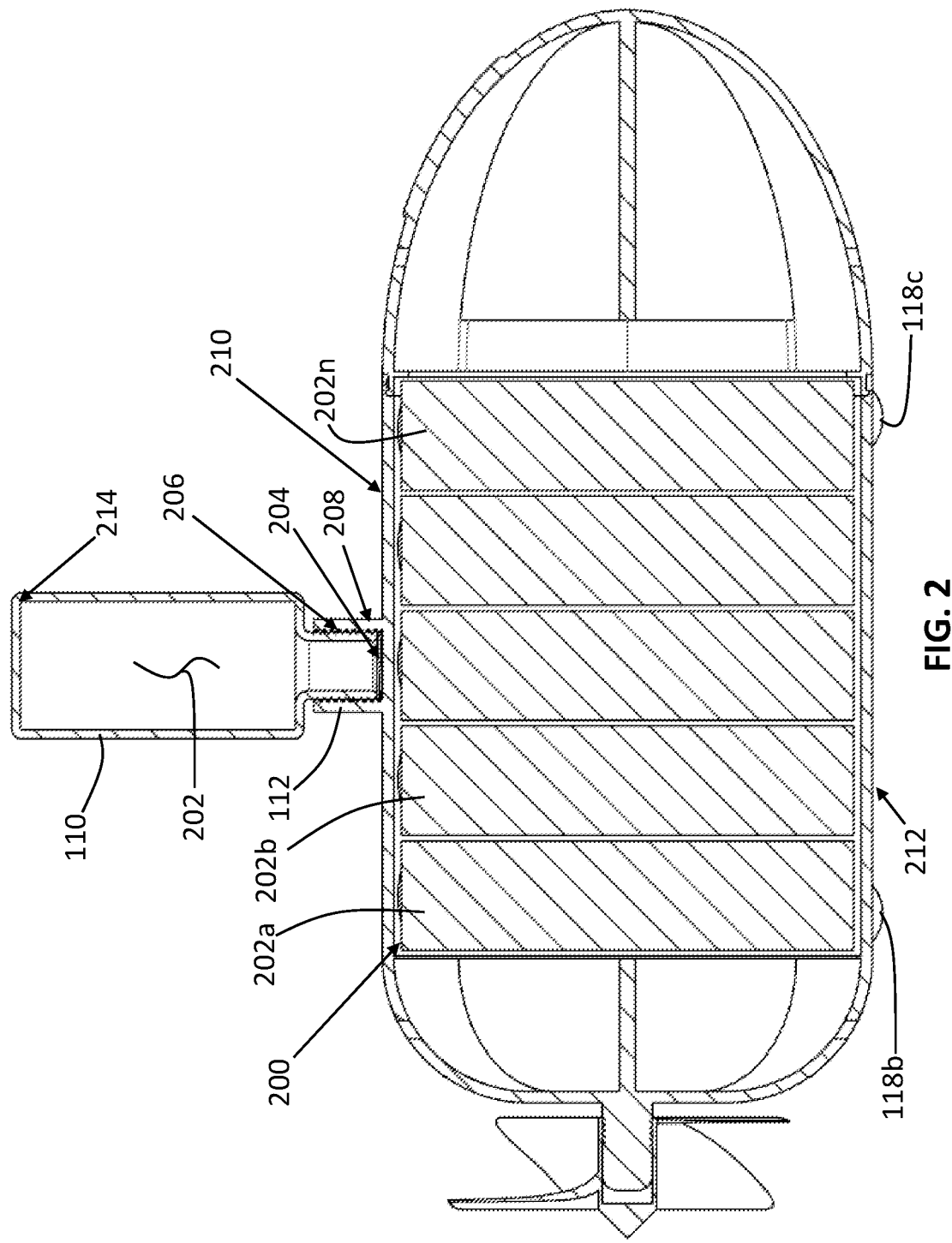
FIG. 2 is a cross-sectional view of the dispenser along section line 2-2 in FIG. 4.
Figure 3:
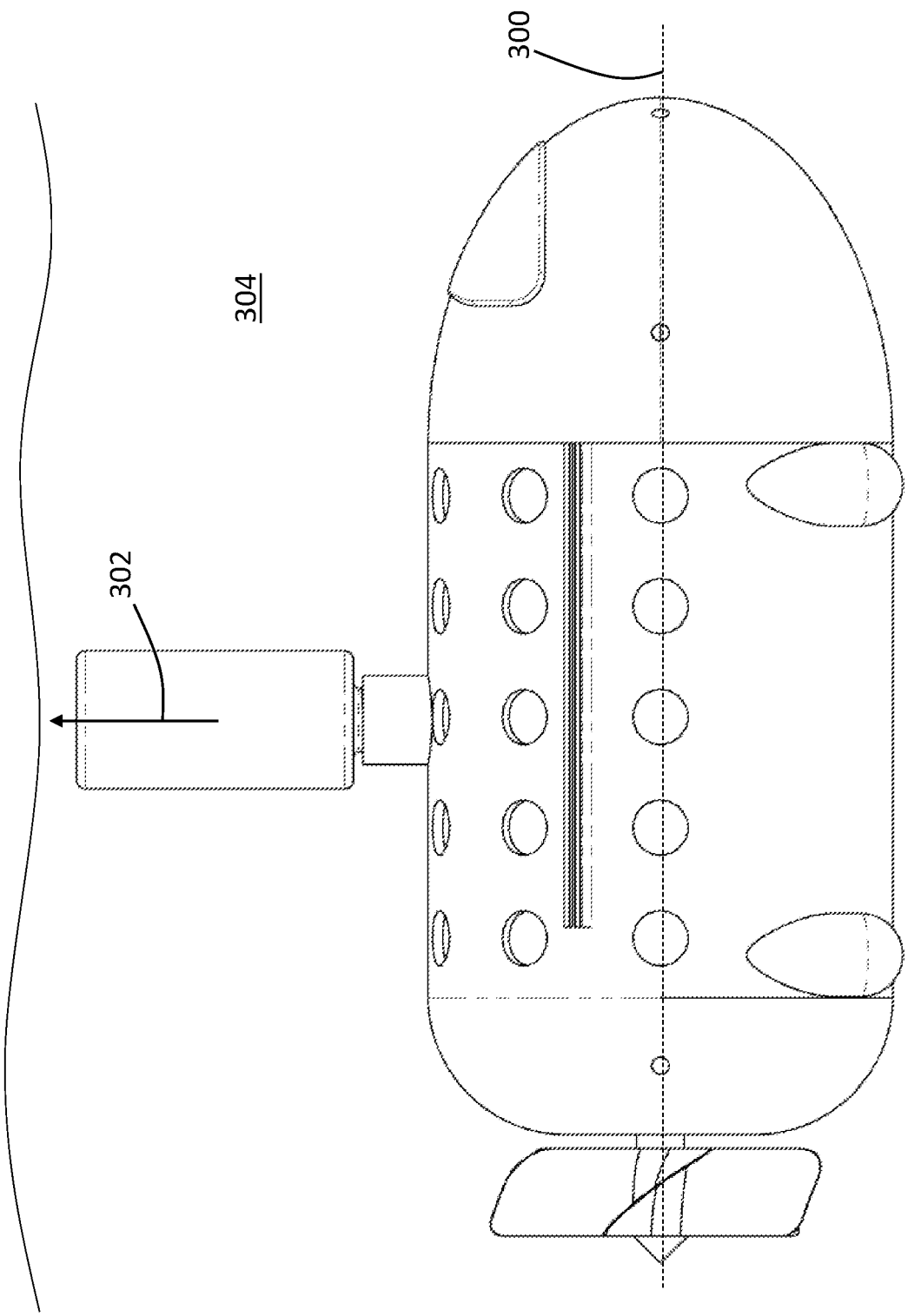
FIG. 3 is an elevational side view of the dispenser submerged within a body of water in accordance with one embodiment of the present invention.
Figure 4:
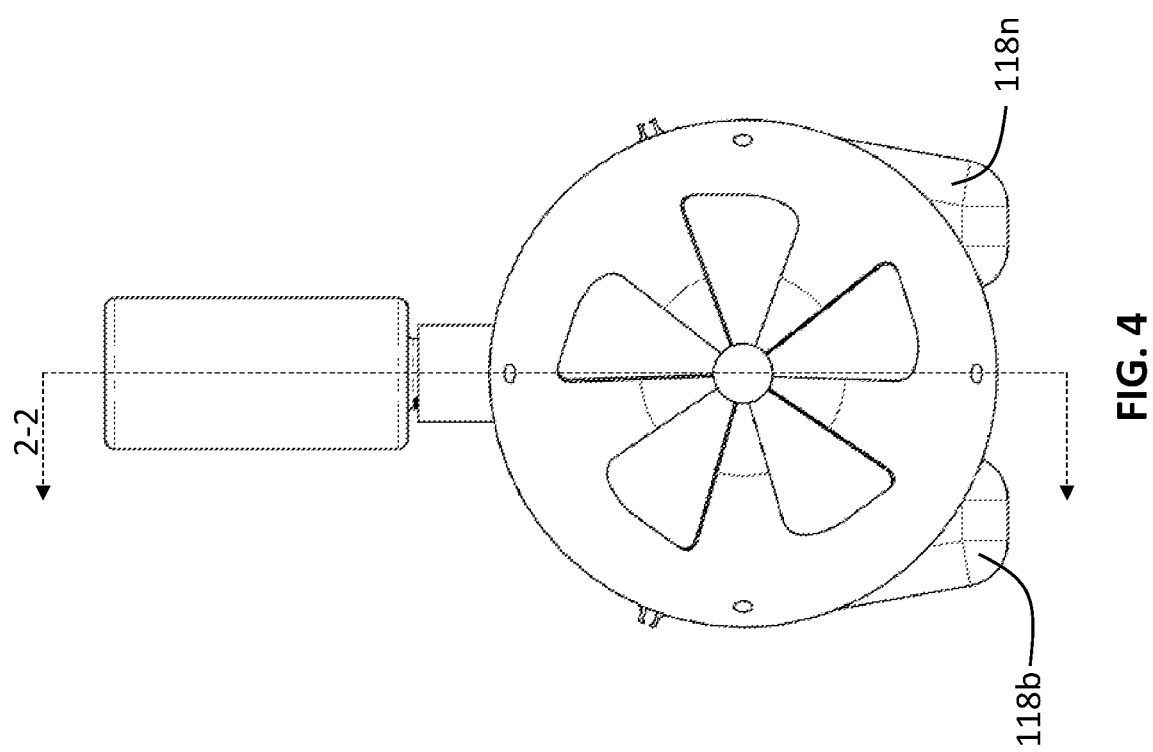
FIG. 4 is an elevational rear view of the dispenser depicted in FIG. 1.
Figure 5:
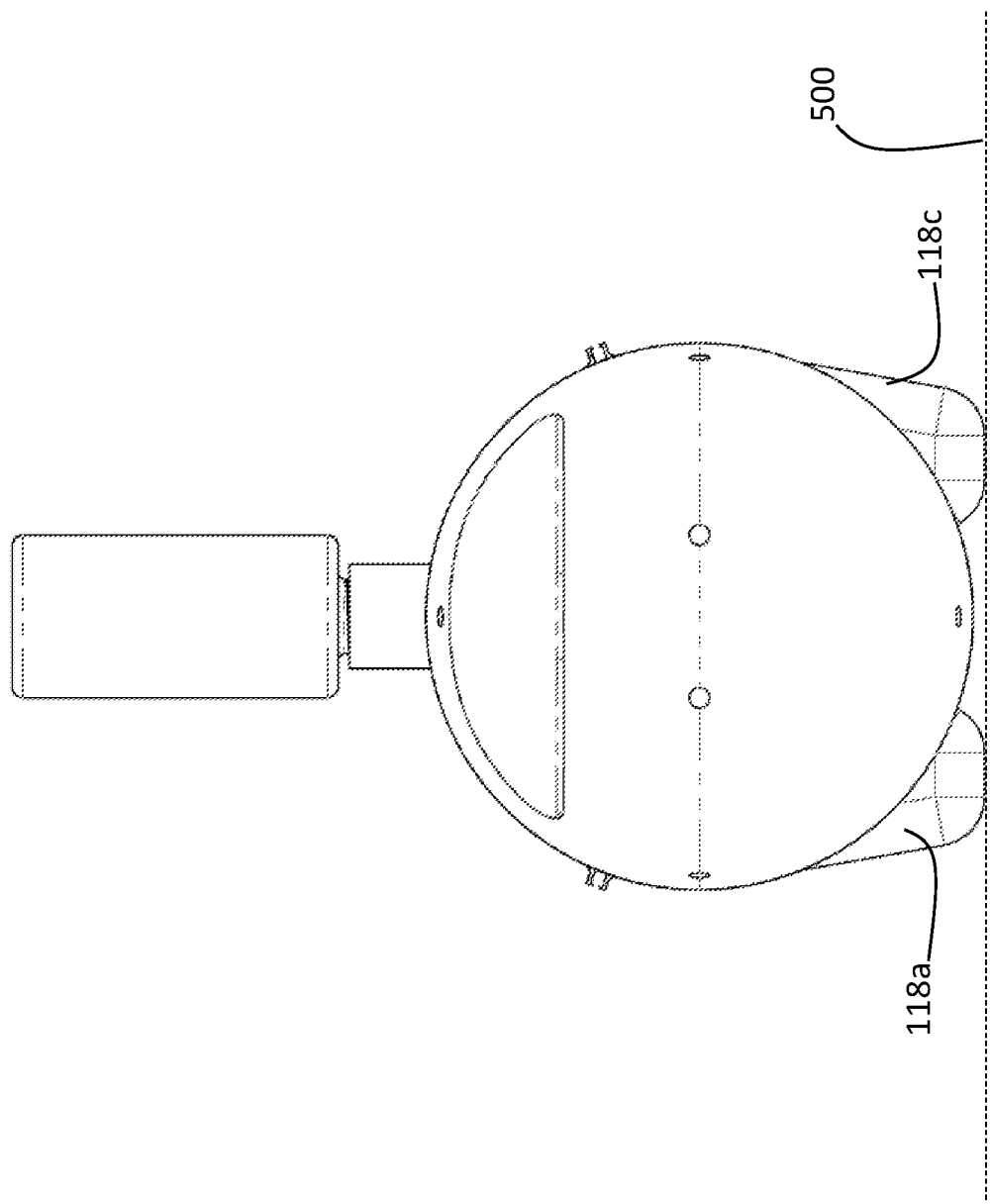
FIG. 5 is an elevational front view of the dispenser depicted in FIG. 1.

The present invention provides a novel and efficient submarine-shaped and submersible chemical dispenser for a pool or other body of water in accordance with one embodiment of the present invention. While shaped as a submarine, other ornamental shapes are envisioned and contemplated within the scope of the present invention. Referring now to FIGS. 1-3, one embodiment of the present invention is shown in a perspective view. FIGS. 1-3, and the other figures, show several advantageous features of the present invention, but, as will be described below, the invention can be provided in several shapes, sizes, combinations of features and components, and varying numbers and functions of the components. The first example of a submarine-shaped and submersible chemical dispenser 100 for a pool or other body of water, e.g., sink, is depicted in FIGS. 1-3.

The submersible chemical dispenser 100 includes a chemical tablet housing 102 defining an internal cavity 200 that may be cylindrical and shaped and sized to receive a plurality of water-soluble chemical tablets 202*a-n*. The dispenser 100 also beneficially includes a buoyancy container 114 defining a buoyancy cavity 202 with a gas, e.g., air, therein. The buoyancy container 114 is operably configured to selectively, removably, and directly couple to the housing 102 in a locked configuration to encapsulate the buoyancy cavity 202. The buoyancy container 114 and encapsulated buoyancy cavity 202 beneficially serve at least two purposes. First, the buoyancy cavity 202 is a low-density fluid displacement mechanism that facilitates in generating a buoyancy force that will act to raise or float the entire housing 102 to which the buoyancy container 114 is coupled. Second, the user can selectively add liquid or another material to the buoyancy container 114 to increase the weight of the buoyancy container 114, thereby increasing the device's 100 overall weight and its ability to be submerged within a body of water. Said another way, the increase in weight will result in the device 100 requiring more buoyancy force in order to cause the device 100 to float or partially float.

Figure 6:
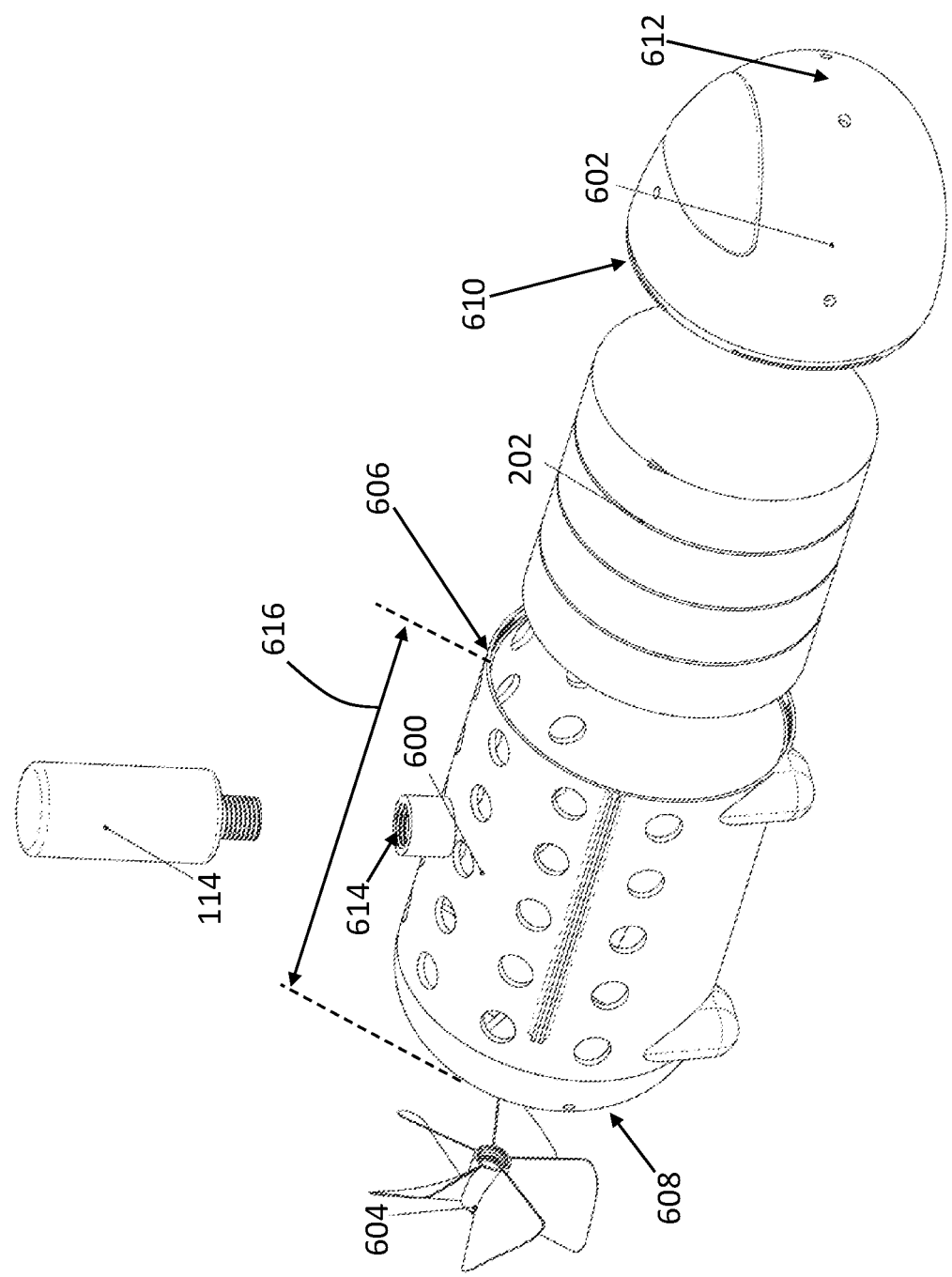
FIG. 6 is an exploded view of the dispenser depicted in FIG. 1.

With reference briefly to FIG. 1 and FIG. 6, the chemical tablet housing 102 may have a main body 600 with a first end 606 and a second end 608, opposite the first end 606, of the main body 600. One or both ends 606, 608 of the main body 600 may include a threading configuration disposed thereon. In other embodiments, another fastening configuration, e.g., tongue-and-groove, may be disposed on the ends 606, 608. The chemical tablet housing 102 may also include a lid 602 with a bottom end 610 and a top end 612, opposing the bottom end 610. The bottom end 610 of the lid 602 is operably configured to selectively, removably, and directly couple to the first end 606 of the main body 600 in a locked and threaded configuration. Said another way, the first end 606 and bottom end 610 may each have a fastening configuration disposed thereon that are operably configured to matingly and rotatably couple to one another in a locked configuration preventing or substantially resisting longitudinal movement. The second end 608 of the main body 600 may also include a propeller 604 coupled thereto using, for example, a friction fitting, a tongue-and-groove or threaded configuration, or other coupling configuration. Said another way, the propeller 604 may also be configured to rotate on the end 608 of the main body 600 using a locking bearing assembly. In further embodiments, the propeller 604 may include a motor operably coupled to the propeller and remote that are operably configurated rotate the propeller and move the dispenser 100 around the body of water 304. In one embodiment, the housing 102, including the main body 600 and lid 602, and buoyancy container 114 are of a polymeric material. For example, the main body 600, including the propeller 604, may be high-density polyethylene (HDPE), which is a thermoplastic polymer produced from the monomer ethylene. The lid 602 may be polyethylene (PE). The buoyancy container 114 may be polycarbonate (PC). In other embodiments, however, the aforementioned materials may vary, but should be water-resistant.

With reference now to FIGS. 1-3 and FIG. 6, the housing 102, namely the main body 600, may include a coupler sidewall 112 disposed and configured to couple with the buoyancy container 114 in a locked configuration to orient the buoyancy container 114 in an upright orientation with respect to a longitudinal axis 300 of the chemical tablet housing 102 and to encapsulate the buoyancy cavity 202. More specifically, the buoyancy container 114 includes a first end 204 operably configured to selectively, removably, and directly couple to the coupler sidewall 112 in a locked configuration using, for example, a threaded configuration. Due to force 302 generated by the orientation of the container 114, the container 114 facilitates in ensuring the housing 102 stays in an orientation that enables a plurality of legs 118*a-n*, wherein "n" represents any number greater than one land planar on a floor surface of the pool. The container 114 also facilitates in ensuring the housing 102 stays in the orientation shown in FIG. 3 to properly distribute dissolving sanitizing medium from the plurality of tablets 202*a-n* through the plurality of apertures 108*a-n* defined on the housing 102.

More specifically, the housing 102 includes an outer surface 116 surrounding the internal cylindrical cavity 200, a plurality of apertures 108*a-n* defined thereon and spatially and fluidly coupled to the internal cylindrical cavity 200. The coupler member 110 is also coupled to the outer surface 116 and includes a coupler sidewall 112. The coupler member 110 projects from the outer surface 116 of the chemical tablet housing 102 and may also include an outer surface 208 and inner surface 206 opposing the outer surface, wherein the inner surface 206 may include threads disposed thereon and defining a coupler member recess 614 shaped and sized to receive the first end 204 of the buoyancy container 114.

The first end 204 of the buoyancy container 114 is also operably configured to selectively, removably, and directly physically couple to the coupler sidewall 112 to fluidly uncouple the buoyancy cavity 202 from the internal cylindrical cavity 200. Fluidly uncoupling and/or hermetically sealing the container 114 from the cavity 200 may be effectuated by having the sidewall 104 of the housing and/or a seal coupled to the inner surface 206 of the coupler sidewall 112 prevent fluid from escaping from the buoyancy cavity 202 (although the internal pressure within the buoyancy cavity 202 will generally be greater than the ambient pressure of subjected by the body of water 304. The buoyancy container 114 may also be coupled to the coupler sidewall 112 in an orientation that is substantially perpendicular (i.e., 90°+/−10°) with respect to a longitudinal axis 300 defined by the chemical tablet housing 102. The buoyancy container 114 may have a length of approximately 2.5 inches spanning from the first end 204 to a second end 214. The first end 204 of the buoyancy container 114 may have a diameter of approximately 0.5 and may define a container opening thereon that is spatially and fluid coupled to the cavity 202.

The outer surface 116 also defines the plurality of the plurality of apertures 108a-n, which may be circular and have a diameter of approximately 0.5 inches. The plurality of the plurality of apertures 108a-n are preferably uniformly shaped and tightly spaced with respect to one another (i.e., within approximately 0.2-0.6 inches) to enable uniform distribution of dissolved sanitizing tablets 202a-n. The main body 600 can be seen having a main body length 616 separating the first and second ends 606, 608 of the main body, and the plurality of apertures 108a-n may also span at least 50% of the main body length 616. Said another way, the main body length 616 may be approximately 4-6 inches and the plurality of apertures 108a-n may collectively span approximately 2-3 inches of the main body length 616, wherein the sidewall 104 of the main body 600 makes up the remaining length. The chemical tablet housing 102 also includes an outer perimeter that spans around the sidewall 104. In one embodiment, the plurality of apertures 108a-n are disposed around at least 25% of the outer perimeter of the sidewall 104 and may also be tightly spaced circumferentially from one another adjacently.

Still referring to FIGS. 1-3 and FIG. 6, the internal cylindrical cavity 200 may include the plurality of water-soluble chemical tablets 108a-n disposed therein in a longitudinally aligned configuration (shown best in FIG. 2). The water-soluble chemical tablets 108a-n may also be disposed within the internal cylindrical cavity 200 in a secure configuration. Said another way, the cylindrical cavity 200 is shaped and sized to receive the water-soluble chemical tablets 108a-n in a snug configuration, or approximately of a diameter 1-2% greater than the diameter of the water-soluble chemical tablets 108a-n. The inner surface of the sidewall 104 defining the internal cylindrical cavity 200 may also include a friction-inducing material, e.g., natural rubber, disposed thereon to facilitate in retaining the water-soluble chemical tablets 108a-n when disposed within the internal cylindrical cavity 200.

In one embodiment, the water-soluble chemical tablets 108a-n may consist of chlorinating agents, such as calcium hypochlorite (used in swimming pool and water purification). In another embodiment, the water-soluble chemical tablets 108a-n may include trichloroisocyanuric acid, which is an organic disinfecting compound having a chemical formula of $C_3Cl_3N_3O_3$. Again, this compound acts as a disinfectant, attacking algicide and bactericide mainly for swimming pools and dyestuffs, and is also used as a bleaching agent in the textile industry. Trichloroisocyanuric acid tablets also dissolve slowly in a water body, but as it reacts, cyanuric acid concentration in a pool will build-up. However, the ability of the device 100 to float or rise, in the orientation shown in FIG. 3, when the water-soluble chemical tablets 108a-n dissolve facilitates in notifying the user when the tablets 108a-n need to be replaced. Said another way, plurality of water-soluble chemical tablets 108a-n generate a combined tablet weight (e.g., 0.51 bf) and the chemical tablet housing 102 generates a housing weight (e.g., 0.51 bf), wherein a buoyancy force (represented with arrow 302) generated from a dispenser 100 submerged in a body of water 304 is less than the combined tablet weight and the housing weight and greater than the housing weight, i.e., when the tablets 108a-n completely dissolve, the device 100 floats to the surface of the body of water 304.

With reference to FIGS. 1-2 and FIGS. 4-5, the plurality of legs 118a-n of the chemical tablet housing 102 may disposed on a bottom side or end 212 thereon. The plurality of legs 118a-n spanning outwardly away from the outer surface 116 of the housing may also include a bottom surface, the bottom surfaces of the plurality of legs defining a lower plane 500 to dispose the buoyancy container 114 at a substantially perpendicular orientation with respect to the lower plane 500. In one embodiment, four legs 118a-n each having a bottom surface, wherein the bottom surfaces of the four legs define the lower plane 500 to dispose the buoyancy container 114 at a substantially perpendicular orientation with respect to the lower plane 500.

Although a specific order of steps associated with using, removing, and the functioning of the device 100, the order of executing the steps may be changed relative to the order shown in certain embodiments. Also, two or more steps may occur in succession may be executed concurrently or with partial concurrence in some embodiments. Certain steps may also be omitted for the sake of brevity. Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A submersible chemical dispenser for a pool comprising:
   a chemical tablet housing defining an internal cylindrical cavity and having an outer surface surrounding the internal cylindrical cavity, having a plurality of apertures defined thereon and spatially and fluidly coupled to the internal cylindrical cavity, a main body with a first end and a second end opposite the first end of the main body, a lid with a bottom end operably configured to selectively, removably, and directly couple to the first end of the main body in a locked and threaded configuration, and a top end opposing the bottom end, the bottom end of the lid, and with a coupler member coupled thereto and having a coupler sidewall, the internal cylindrical cavity shaped and sized to receive a plurality of water-soluble chemical tablets; and
   a buoyancy container defining a buoyancy cavity with a gas therein and having a first end operably configured to selectively, removably, and directly couple to the coupler sidewall in a locked configuration to orient the buoyancy container in an upright orientation with respect to a longitudinal axis of the chemical tablet housing and to encapsulate the buoyancy cavity.

2. The submersible chemical dispenser for a pool according to claim 1, wherein the main body further comprises:
a main body length separating the first and second ends of the main body, the plurality of apertures spanning at least 50% of the main body length.

3. The submersible chemical dispenser for a pool according to claim 2, wherein the chemical tablet housing further comprises:
an outer perimeter, the plurality of apertures disposed around at least 25% of the outer perimeter.

4. The submersible chemical dispenser for a pool according to claim 3, wherein:
the plurality of apertures are disposed in a tightly spaced configuration with respect to one another.

5. The submersible chemical dispenser for a pool according to claim 1, wherein:
the internal cylindrical cavity includes the plurality of water-soluble chemical tablets disposed therein in a longitudinally aligned configuration.

6. The submersible chemical dispenser for a pool according to claim 5, wherein:
the plurality of water-soluble chemical tablets are disposed within the internal cylindrical cavity in a secure configuration.

7. The submersible chemical dispenser for a pool according to claim 5, wherein:
the plurality of water-soluble chemical tablets generate a combined tablet weight; and
the chemical tablet housing generates a housing weight, wherein a buoyancy force generated from a submerged chemical dispenser is less than the combined tablet weight and the housing weight and greater than the housing weight.

8. The submersible chemical dispenser for a pool according to claim 1, wherein:
the coupler member projects from the outer surface of the chemical tablet housing and includes an outer surface and inner surface opposing the outer surface, the inner surface including threads disposed thereon and defining a coupler member recess shaped and sized to receive the first end of the buoyancy container.

9. The submersible chemical dispenser for a pool according to claim 1, wherein:
the first end of the buoyancy container is operably configured to selectively, removably, and directly physically couple to the coupler sidewall, wherein the buoyancy cavity is fluidly uncoupled to the internal cylindrical cavity.

10. The submersible chemical dispenser for a pool according to claim 1, wherein:
the buoyancy container is coupled to the coupler sidewall and oriented at a substantially perpendicular orientation with respect to a longitudinal axis defined by the chemical tablet housing.

11. The submersible chemical dispenser for a pool according to claim 1, wherein the chemical tablet housing further comprises:
an upper end with the coupler member disposed thereon and a lower end, opposite the upper end of the chemical tablet housing, having a plurality of legs disposed thereon and spanning outwardly away from the outer surface.

12. The submersible chemical dispenser for a pool according to claim 11, wherein the plurality of legs each further comprise:
a bottom surface, the bottom surfaces of the plurality of legs defining a lower plane to dispose the buoyancy container at a substantially perpendicular orientation with respect to the lower plane.

13. A submersible chemical dispenser for a pool comprising:
a chemical tablet housing defining an internal cylindrical cavity with a plurality of water-soluble chemical tablets disposed therein in a secure and aligned configuration, having an outer surface surrounding the internal cylindrical cavity, having a plurality of apertures defined thereon and spatially and fluidly coupled to the internal cylindrical cavity, and with a coupler member coupled to and extending in a direction away from the outer surface of the chemical tablet housing on an upper side thereof and having a coupler sidewall, the chemical tablet housing having a plurality of legs each respectively coupled to and extending a direction away from the outer surface of the chemical tablet housing and opposite the direction the coupler member is extending away from the outer surface; and
a buoyancy container defining a buoyancy cavity with a gas therein and having a first end operably configured to selectively, removably, and directly couple to the coupler sidewall in a locked configuration to encapsulate the buoyancy cavity.

14. The submersible chemical dispenser for a pool according to claim 13, wherein:
the locked configuration includes the buoyancy container oriented in an upright orientation with respect to a longitudinal axis of the chemical tablet housing.

15. The submersible chemical dispenser for a pool according to claim 13, wherein the plurality of legs each further comprises:
four legs each having a bottom surface, the bottom surfaces of the four legs defining a lower plane to dispose the buoyancy container at a substantially perpendicular orientation with respect to the lower plane.

16. A submersible chemical dispenser for a pool comprising:
a chemical tablet housing generating a housing weight, defining an internal cylindrical cavity, having an outer surface surrounding the internal cylindrical cavity, having a plurality of apertures defined thereon and spatially and fluidly coupled to the internal cylindrical cavity, and with a coupler member coupled thereto and having a coupler sidewall, the internal cylindrical cavity shaped and sized to receive a plurality of water-soluble chemical tablets generating a combined tablet weight; and
a buoyancy container defining a buoyancy cavity with a gas therein and having a first end operably configured to selectively, removably, and directly couple to the coupler sidewall in a locked configuration to orient the buoyancy container in an upright orientation with respect to a longitudinal axis of the chemical tablet housing and to encapsulate the buoyancy cavity, wherein a buoyancy force generated from a submerged chemical dispenser is less than the combined tablet weight and the housing weight and greater than the housing weight.

* * * * *